US011955599B2

(12) United States Patent
Oshima et al.

(10) Patent No.: US 11,955,599 B2
(45) Date of Patent: Apr. 9, 2024

(54) NEGATIVE ELECTRODE MATERIAL AND BATTERY

(71) Applicant: Panasonic Intellectual Property Management Co., Ltd., Osaka (JP)

(72) Inventors: Tatsuya Oshima, Osaka (JP); Izuru Sasaki, Kyoto (JP); Seiji Nishiyama, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 621 days.

(21) Appl. No.: 17/161,001

(22) Filed: Jan. 28, 2021

(65) Prior Publication Data

US 2021/0151792 A1 May 20, 2021

Related U.S. Application Data

(63) Continuation of application No. PCT/JP2019/040062, filed on Oct. 10, 2019.

(30) Foreign Application Priority Data

Nov. 29, 2018 (JP) .................................. 2018-224238

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0407* (2013.01); *H01M 4/366* (2013.01);
(Continued)

(58) Field of Classification Search
CPC ........... H01M 10/0562; H01M 4/0407; H01M 4/366; H01M 10/0525; H01M 2004/027; H01M 2004/028; H01M 2300/0068
(Continued)

(56) References Cited

U.S. PATENT DOCUMENTS 4,352,869 A 10/1982 Mellors
5,506,073 A 4/1996 Angell et al.
(Continued)

FOREIGN PATENT DOCUMENTS

CN 105254184 A 1/2016
CN 105680048 A 6/2016
(Continued)

OTHER PUBLICATIONS

International Search Report of PCT application No. PCT/JP2019/040062 dated Dec. 24, 2019.
(Continued)

*Primary Examiner* — James M Erwin
(74) *Attorney, Agent, or Firm* — Rimon P.C.

(57) ABSTRACT

The present disclosure provides a negative electrode material that can improve the charge-discharge efficiency of a battery. A negative electrode material includes a reduced form of a first solid electrolyte material and a conductive auxiliary. The first solid electrolyte material is denoted by Formula (1): $Li_{6\alpha}M_{\beta}X_{\gamma}$. Herein, in Formula (1), each of $\alpha$, $\beta$, and $\gamma$ is a value greater than 0, M represents at least one element selected from the group consisting of metal elements except Li and semimetals, and X represents at least one element selected from the group consisting of F, Cl, Br, and I.

20 Claims, 1 Drawing Sheet

(51) Int. Cl.
  *H01M 4/36* (2006.01)
  *H01M 10/0525* (2010.01)
  *H01M 4/02* (2006.01)
(52) U.S. Cl.
  CPC .. *H01M 10/0525* (2013.01); *H01M 2004/027* (2013.01); *H01M 2004/028* (2013.01); *H01M 2300/0068* (2013.01)
(58) Field of Classification Search
  USPC ...................................................... 429/322
  See application file for complete search history.

(56) References Cited

U.S. PATENT DOCUMENTS

| | | | |
|---|---|---|---|
| 5,714,279 | A | 2/1998 | Zajac, Jr. et al. |
| 6,428,935 | B1 | 8/2002 | Takada et al. |
| 9,160,034 | B2 | 10/2015 | Kato et al. |
| 10,008,735 | B2 | 6/2018 | Ohtomo et al. |
| 2004/0121235 | A1 | 6/2004 | Amatucci |
| 2004/0151986 | A1 | 8/2004 | Park et al. |
| 2011/0045355 | A1 | 2/2011 | Ichikawa |
| 2011/0300444 | A1 | 12/2011 | Nakamura |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359192 | A1 | 12/2016 | Homma et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0222261 | A1* | 8/2017 | Kambara .......... H01M 10/0525 |
| 2017/0229734 | A1 | 8/2017 | Furukawa et al. |
| 2017/0288281 | A1 | 10/2017 | Chiang et al. |
| 2017/0309964 | A1 | 10/2017 | Iwamoto |
| 2018/0076452 | A1 | 3/2018 | Sasaki et al. |
| 2018/0183065 | A1 | 6/2018 | Sasaki |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328464 | A1 | 10/2020 | Asano et al. |
| 2020/0328465 | A1 | 10/2020 | Sakaida et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350561 | A1 | 11/2020 | Kamitake et al. |
| 2020/0350615 | A1 | 11/2020 | Sakaida et al. |
| 2020/0350621 | A1 | 11/2020 | Sugimoto et al. |
| 2020/0350622 | A1 | 11/2020 | Sakaida et al. |
| 2020/0350624 | A1 | 11/2020 | Sasaki et al. |
| 2021/0151791 | A1 | 5/2021 | Oshima et al. |

FOREIGN PATENT DOCUMENTS

| | | |
|---|---|---|
| CN | 108701860 A | 10/2018 |
| EP | 2916381 B1 | 6/2016 |
| EP | 3043411 A1 | 7/2016 |
| EP | 3428929 A1 | 1/2019 |
| EP | 3496202 A1 | 6/2019 |
| EP | 3736827 A1 | 11/2020 |
| EP | 3736829 A1 | 11/2020 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| EP | 3863028 A1 | 8/2021 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | H11-238528 A | 8/1999 |
| JP | 2001-052733 A | 2/2001 |
| JP | 2004-235155 A | 8/2004 |
| JP | 2006-244734 A | 9/2006 |
| JP | 2008-021556 A | 1/2008 |
| JP | 2008-060033 | 3/2008 |
| JP | 2008-234988 | 10/2008 |
| JP | 2011-129312 | 6/2011 |
| JP | 2011-253762 | 12/2011 |
| JP | 5076134 B2 | 11/2012 |
| JP | 2012-246196 A | 12/2012 |
| JP | 2013-073791 A | 4/2013 |
| JP | 2013-109881 A | 6/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-111954 | 6/2017 |
| JP | 2017-117753 A | 6/2017 |
| JP | 2017-518622 A | 7/2017 |
| JP | 2017-152324 A | 8/2017 |
| JP | 2017-199668 | 11/2017 |
| JP | 6222134 B2 | 11/2017 |
| JP | 2017-224474 A | 12/2017 |
| WO | 2000/028608 | 5/2000 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2015/136623 | 9/2015 |
| WO | 2017/047015 | 3/2017 |
| WO | 2017/108105 A1 | 6/2017 |
| WO | 2017/154766 A1 | 9/2017 |
| WO | 2017/154922 A1 | 9/2017 |
| WO | 2018/025582 | 2/2018 |
| WO | 2018/025582 A1 | 2/2018 |

OTHER PUBLICATIONS

Fudong Han et al., "A Battery Made from a Single Material", Advanced Materials, 27 (2015), pp. 3473-3483.
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.
William D. Richards et al., "Interface Stability in Solid-State Batteries", Chemistry of Materials, 2016, vol. 28, Dec. 7, 2015, pp. 266-273.
International Search Report of International Application No. PCT/JP2018/045584 dated Mar. 19, 2019.

(56) References Cited

OTHER PUBLICATIONS

The Indian Office Action dated Feb. 14, 2023 for the related Indian Patent Application No. 202147005631.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.

Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
International Search Report of International Application No. PCT/JP2018/046264 dated Mar. 19, 2019.
International Search Report of International Application No. PCT/JP2018/045588 dated Mar. 19, 2019.
International Search Report of International Application No. PCT/JP2018/042060 dated Jan. 29, 2019.
International Search Report of International Application No. PCT/JP2019/040062 dated Dec. 24, 2019.
International Search Report of International Application No. PCT/JP2019/040063 dated Dec. 24, 2019.
Andreas Bohnsack et al., "The Bromides Li3MBr6 (M=Sm-Lu, Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb-Lu, Y, Sc): Synthesis, Crystal Structures, and Ionic Motion", Journal of Inorganic and General Chemistry, Jul. 1997, vol. 623/Issue 7, pp. 1067-1073.
The Extended European Search Report dated Feb. 11, 2021 for the related European Patent Application No. 18902871.5.
The Extended European Search Report dated Feb. 10, 2021 for the related European Patent Application No. 18902731.1.
The Extended European Search Report dated Feb. 17, 2021 for the related European Patent Application No. 18902279.1.
The Extended European Search Report dated Dec. 20, 2021 for the related European Patent Application No. 19891097.8.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 4, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle lonenleiter vom Typ MI3 MIIICl6 (Mi=Li, Na, Ag; MIII=In, Y)." Zeitschrift fur anorganhische und allgemeine Chemie 613.7 (1992): 26-30 (Year: 1992).

\* cited by examiner

NEGATIVE ELECTRODE MATERIAL AND BATTERY

BACKGROUND

1. Technical Field

The present disclosure relates to a negative electrode material and a battery.

2. Description of the Related Art

F. Han et al., "A Battery Made from Single Material", Adv. Mater. 27 (2015), 3473-3483 discloses an all-solid lithium ion battery in which a sulfide solid electrolyte material is used as a negative electrode material.

SUMMARY

Regarding the related art, it is desirable to further improve the charge-discharge efficiency of a battery.

In one general aspect, the techniques disclosed here feature a negative electrode material according to an aspect of the present disclosure includes a reduced form of a first solid electrolyte material and a conductive auxiliary, wherein the first solid electrolyte material is denoted by Formula (1) below, $$Li_\alpha M_\beta X_\gamma \qquad \text{Formula (1)}$$

herein, in Formula (1), each of α, β, and γ is a value greater than 0, M represents at least one element selected from the group consisting of metal elements except Li and semimetals, and X represents at least one element selected from the group consisting of F, Cl, Br, and I.

According to the present disclosure, the charge-discharge efficiency of the battery can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
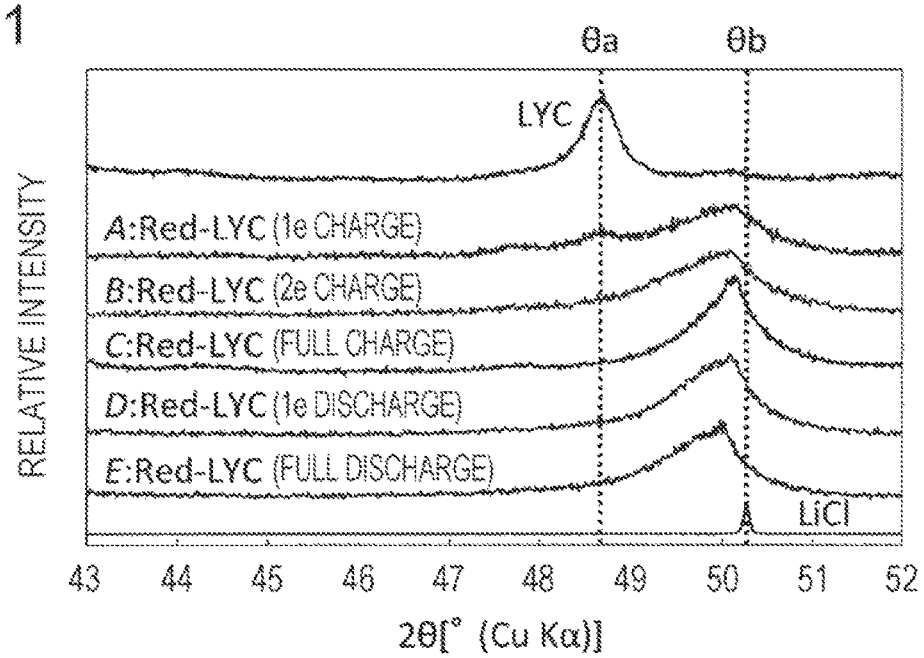
FIG. 1 is a diagram illustrating X-ray diffraction patterns of a reduced form of $Li_{2.7}Y_{1.1}Cl_6$ that is an example of a reduced form of a first solid electrolyte material.

The embodiments according to the present disclosure will be described below with reference to the drawings.

First Embodiment

A negative electrode material according to the first embodiment contains a reduced form (hereafter also referred to as "halide reduced form") of a first solid electrolyte material (hereafter also referred to as "halide solid electrolyte material") and a conductive auxiliary. The halide solid electrolyte material is a material denoted by Formula (1) below.

$$Li_\alpha M_\beta X_\gamma \qquad \text{Formula (1)}$$

Herein, in Formula (1) above, each of α, β, and γ is a value greater than 0. In addition, M represents at least one element selected from the group consisting of metal elements except Li and semimetals. X represents at least one element selected from the group consisting of F, Cl, Br, and I.

In this regard, "semimetals" include B, Si, Ge, As, Sb, and Te.

Meanwhile, "metal elements" include
(i) all elements except hydrogen which are included in groups I to XII of the periodic table, and
(ii) all elements except B, Si, Ge, As, Sb, Te, C, N, P, O, S, and Se which are included in groups XIII to XVI of the periodic table. That is, "metal elements" are a group of elements that may become cations when forming inorganic compounds with halides.

The negative electrode material according to the first embodiment can improve the charge-discharge efficiency of a battery due to the above-described configuration. In this regard, the charge-discharge efficiency can be determined by using the following formula.

charge-discharge efficiency(%)=(discharge capacity/charge capacity)×100

As described above, F. Han et al., "A Battery Made from Single Material", Adv, Mater. 27 (2015), 3473-3483 cited in the section "Background Art" discloses a battery in which the negative electrode material is the reduced form of the sulfide solid electrolyte material (hereafter also referred to as "sulfide reduced form"). The present inventors performed intensive research and, as a result, found that a battery in which a sulfide reduced material was used as a negative electrode material had a problem of a reduction in charge-discharge efficiency of the battery because of, for example, low electron conductivity and low ionic conductivity of the sulfide reduced form. The above-described halide reduced form exhibits favorable electron conductivity and favorable ionic conductivity. That is, the negative electrode material according to the first embodiment includes a halide reduced form that exhibits favorable electron conductivity and favorable ionic conductivity and a conductive auxiliary that assists electron conductivity and, therefore, can improve the charge-discharge efficiency of the battery.

The halide solid electrolyte material in the first embodiment may satisfy $1 \leq \alpha \leq 5$, $0 < \beta \leq 2$, and $5.5 \leq \gamma \leq 6.5$ in Formula (1) above.

In addition, the halide solid electrolyte material in the first embodiment may satisfy $1.5 \leq \alpha \leq 4.5$, $0.5 \leq \beta \leq 1.5$, and $\gamma = 6$ in Formula (1).

Further, the halide solid electrolyte material in the first embodiment may satisfy, for example, α=2.7, β=1.1, and γ=6 in Formula (1).

According to the above-described configuration, the charge-discharge efficiency of the battery can be further improved.

The halide solid electrolyte material in the first embodiment may satisfy the relationship represented by $\alpha+m\beta=\gamma$ in Formula (1). Herein, m represents the valence of M. In this regard, in the case in which M contains a plurality of types of elements, $m\beta$ is the total of the products of the respective composition ratios of the elements multiplied by the respective valences of the elements. For example, in the case in which M contains an element M1 and an element M2, the composition ratio of the element M1 is $\beta_1$, the valence of the element M1 is $m_1$, the composition ratio of the element M2 is $\beta_2$, and the valence of the element M2 is $m_2$, $m\beta=m_1\beta_1+m_2\beta_2$ applies. In the case in which M is considered to have a plurality of valences, the above-described relational formula has to be satisfied with respect to each of the valences, where m takes on the respective valence.

According to the above-described configuration, the charge-discharge efficiency of the battery can be further improved.

In Formula (1) above, M may contain at least one element selected from the group consisting of transition metal elements.

According to the above-described configuration, the charge-discharge efficiency of the battery can be further improved.

In Formula (1) above, M may contain yttrium(=Y). That is, the halide solid electrolyte material may contain Y as a metal element.

The halide solid electrolyte material containing Y may be denoted by Formula (2) below.

$$Li_aMe_bY_cX_6 \qquad \text{Formula (2)}$$

Herein, in Formula (2), a, b, and c satisfies $a+m_eb+3c=6$ and $c>0$, and Me represents at least one element selected from the group consisting of metal elements except Li and Y and semimetals. In addition, $m_e$ represents the valence of Me. In this regard, in the case in which Me contains a plurality of types of elements, $m_eb$ is the total of the products of the respective composition ratios of the elements multiplied by the respective valences of the elements. For example, in the case in which Me contains an element Me1 and an element Me2, the composition ratio of the element Me1 is $b_1$, the valence of the element Me1 is $m_{e1}$, the composition ratio of the element Me2 is $b_2$, and the valence of the element Me2 is $m_{e2}$, $m_eb=m_{e1}b_1+m_{e2}b_2$ applies. In this regard, Me1 may be at least one selected from the group consisting of Mg, Ca, Sr, Ba, Zn, Sc, Al, Ga, Bi, Zr, Hf, Ti, Sn, Ta, and Nb. In the case in which Me is considered to have a plurality of valences, the above-described relational formula has to be satisfied with respect to each of the valences, where $m_e$ takes on the respective valence.

In the negative electrode material according to the first embodiment, in the case in which the halide solid electrolyte material satisfies Formula (2) above, the charge-discharge efficiency of the battery can be further improved.

The halide solid electrolyte material in the first embodiment may be a material denoted by Composition formula (3) below.

$$Li_{6-3d}Y_dX_6 \qquad \text{Formula (3)}$$

Herein, in Composition formula (3), X represents at least two elements selected from the group consisting of Cl, Br, and I. In addition, in Composition formula (3), d satisfies $0<d<2$.

Regarding the negative electrode material according to the first embodiment, in the case in which the halide solid electrolyte material satisfies Formula (3), the negative electrode material according to the first embodiment can improve the cycle characteristics of the battery and, in addition, can also improve the charge-discharge efficiency of the battery. Further, since the halide solid electrolyte material that satisfies Formula (3) has high ionic conductivity, a halide reduced form can be efficiently generated.

The halide solid electrolyte material according to the first embodiment may be a material denoted by Formula (4) below.

$$Li_3YX_6 \qquad \text{Formula (4)}$$

Herein, in Composition formula (4), X represents at least two elements selected from the group consisting of Cl, Br, and I. That is, in Composition formula (3) above, d may be 1.

Regarding the negative electrode material according to the first embodiment, in the case in which the halide solid electrolyte material satisfies Formula (4), the negative electrode material according to the first embodiment can improve the cycle characteristics of the battery and, in addition, can also improve the charge-discharge efficiency of the battery. Further, since the halide solid electrolyte material that satisfies Formula (4) has high ionic conductivity, a halide reduced form can be efficiently generated.

The halide solid electrolyte material according to the first embodiment may be a material denoted by Composition formula (5) below.

$$Li_{3-3\delta}Y_{1+\delta}Cl_6 \qquad \text{Formula (5)}$$

Herein, in Composition formula (5), $0<\delta\leq0.15$ is satisfied.

Regarding the negative electrode material according to the first embodiment, in the case in which the halide solid electrolyte material satisfies Formula (5), the negative electrode material according to the first embodiment can improve the cycle characteristics of the battery and, in addition, can also improve the charge-discharge efficiency of the battery. Further, since the halide solid electrolyte material that satisfies Formula (5) has high ionic conductivity, a halide reduced form can be efficiently generated.

The halide solid electrolyte material according to the first embodiment may be a material denoted by Composition formula (6) below.

$$Li_{3-3\delta}Y_{1+\delta}Br_6 \qquad \text{Formula (6)}$$

Herein, in Composition formula (6), $0<\delta\leq0.25$ is satisfied.

Regarding the negative electrode material according to the first embodiment, in the case in which the halide solid electrolyte material satisfies Formula (6), the negative electrode material according to the first embodiment can improve the cycle characteristics of the battery and, in addition, can also improve the charge-discharge efficiency of the battery. Further, since the halide solid electrolyte material that satisfies Formula (6) has high ionic conductivity, a halide reduced form can be efficiently generated.

The halide solid electrolyte material in the first embodiment may be a material denoted by Composition formula (7) below.

$$Li_{3-3\delta+a}Y_{1+\delta-a}Me_aCl_{6-x-y}Br_xI_y \qquad \text{Formula (7)}$$

Herein, in Composition formula (7), Me represents at least one element selected from the group consisting of Mg, Ca, Sr Ba, and Zn. Further, in Composition formula (7), $-1<\delta<2$, $0<a<3$, $0<(3-3\delta+a)$, $0<(1+\delta-a)$ $0 \leq x \leq 6,$ $0 \leq y \leq 6,$ and $(x+y) \leq 6$ are satisfied.

Regarding the negative electrode material according to the first embodiment, in the case in which the halide solid electrolyte material satisfies Formula (7), the negative electrode material according to the first embodiment can improve the cycle characteristics of the battery and, in addition, can also improve the charge-discharge efficiency of the battery. Further, since the halide solid electrolyte material that satisfies Formula (7) has high ionic conductivity, a halide reduced form can be efficiently generated.

The halide solid electrolyte material in the first embodiment may be a material denoted by Composition formula (8) below.

$$Li_{3-3\delta}Y_{1+\delta-a}Me_aCl_{6-x-y}Br_xI_y \quad \text{Formula (8)}$$

Herein, in Composition formula (8), Me represents at least one element selected from the group consisting of Al, Sc, Ga, and Bi. Further, in Composition formula (8), $-1<\delta<1,$ $0<a<2,$ $0<(1+\delta-a)$ $0 \leq x \leq 6,$ $0 \leq y \leq 6,$ and $(x+y) \leq 6$ are satisfied.

Regarding the negative electrode material according to the first embodiment, in the case in which the halide solid electrolyte material satisfies Formula (8), the negative electrode material according to the first embodiment can improve the cycle characteristics of the battery and, in addition, can also improve the charge-discharge efficiency of the battery. Further, since the halide solid electrolyte material that satisfies Formula (8) has high ionic conductivity, a halide reduced form can be efficiently generated.

The halide solid electrolyte material in the first embodiment may be a material denoted by Composition formula (9) below.

$$Li_{3-3\delta-a}Y_{1+\delta-a}Me_aCl_{6-x-y}Br_xI_y \quad \text{Formula (9)}$$

Herein, in Composition formula (9), Me represents at least one element selected from the group consisting of Zr, Hf, and Ti. Further, in Composition formula (9), $-1<\delta<1,$ $0<a<1.5,$ $0<(3-3\delta-a),$ $0<(1+\delta-a)$ $0 \leq x \leq 6,$ $0 \leq y \leq 6,$ and $(x+y) \leq 6$ are satisfied.

Regarding the negative electrode material according to the first embodiment, in the case in which the halide solid electrolyte material satisfies Formula (9), the negative electrode material according to the first embodiment can improve the cycle characteristics of the battery and, in addition, can also improve the charge-discharge efficiency of the battery. Further, since the halide solid electrolyte material that satisfies Formula (9) has high ionic conductivity, a halide reduced form can be efficiently generated.

The halide solid electrolyte material in the first embodiment may be a material denoted by Composition formula (10) below.

$$Li_{3-3\delta-2a}Y_{1+\delta-a}Me_aCl_{6-x-y}Br_xI_y \quad \text{Formula (10)}$$

Herein, in Composition formula (10), Me represents at least one element selected from the group consisting of Ta and Nb. Further, in Composition formula (10), $-1<\delta<1,$ $0<a<1.2,$ $0<(3-3\delta-2a),$ $0<(1+\delta-a)$ $0 \leq x \leq 6,$ $0 \leq y \leq 6,$ and $(x+y) \leq 6$ are satisfied.

Regarding the negative electrode material according to the first embodiment, in the case in which the halide solid electrolyte material satisfies Formula (10), the negative electrode material according to the first embodiment can improve the cycle characteristics of the battery and, in addition, can also improve the charge-discharge efficiency of the battery. Further, since the halide solid electrolyte material that satisfies Formula (10) has high ionic conductivity, a halide reduced form can be efficiently generated.

Specific examples of the halide solid electrolyte material in the first embodiment include $Li_{2.7}Y_{1.1}Cl_6$, $Li_3YBr_3Cl_3$, $Li_3YBr_6$, $Li_{2.5}Zr_{0.5}Y_{0.5}Cl_6$, $Li_3YBr_2Cl_2I_2$, $Li_{3.1}Y_{0.9}Ca_{0.1}Cl_6$, $Li_3Y_{0.8}Al_{0.2}Cl_6$, $Li_{2.5}Y_{0.5}Hf_{0.5}Cl_6$, $Li_{2.8}Y_{0.9}Ta_{0.1}Cl_6$, $Li_{4.5}Y_{0.475}Bi_{0.025}Cl_6$, and $Li_{1.5}Y_{1.425}Bi_{0.075}Cl_6$.

Regarding the negative electrode material according to the first embodiment, in the case in which the halide solid electrolyte material is the material described above as an example, the negative electrode material according to the first embodiment can improve the cycle characteristics of the battery and, in addition, can also improve the charge-discharge efficiency of the battery. Further, since the material described above as an example has high ionic conductivity, a halide reduced form can be efficiently generated.

Regarding the halide solid electrolyte material in the first embodiment, other than the above-described materials, for example, known solid electrolyte materials that satisfy Formula (1) above may be used.

Regarding the halide reduced form in the first embodiment, in an X-ray diffraction pattern obtained by X-ray diffraction measurement in which the Cu—Kα ray is used as a radiation source, a peak top may be present at the value of the diffraction angle 2θ within the range of greater than or equal to θa and less than or equal to θb.

Herein, θb is a value of the diffraction angle 2θ of the peak top of a peak reflecting the (220) face of LiX composed of halogen(=X) contained in the halide reduced form and Li. The peak of the (220) face of LiX is a peak of the (220) face expressed in Miller index hkl of a rock-salt-type structure having a crystal structure belonging to space group Fm-3m of LiCl, LiBr, LiI, or the like. In this regard, in the case in which at least two types of halogens are contained in the halide reduced form, a halogen having a smaller atomic number is selected as the halogen for determining θb.

Meanwhile, θa is a value of the diffraction angle 2θ of the peak top of a peak derived from the halide solid electrolyte material and is a value closest to θb above.

According to the above-described configuration, the negative electrode material according to the first embodiment can further improve the charge-discharge efficiency of the battery. Specifically, the peak derived from the halide reduced form shifts from θa to θb in accordance with Li occlusion. On the other hand, the peak derived from the halide reduced form shifts from θb to θa in accordance with Li release. It is considered that the crystal structure of the halide reduced form shrinks and expands in accordance with Li occlusion and Li release. Therefore, it is conjectured that the negative electrode material containing the halide reduced form improves the charge-discharge efficiency.

In this connection, the X-ray diffraction patterns of the halide solid electrolyte material and the reduced form thereof are examined by using, as an example, the reduced form of $Li_{2.7}Y_{1.1}Cl_6$ that is an example of the reduced form of the halide solid electrolyte material. Incidentally, $Li_{2.7}Y_{1.1}Cl_6$ is a halide solid electrolyte material that is used in Example 1 described later. Hereafter $Li_{2.7}Y_{1.1}Cl_6$ is also referred to as "LYC".

LYC was produced by the same method as the method described in Example 1. Further, $Li_2S$—$P_2S_5$ (hereafter also referred to as "LPS") that was a glass-ceramic-like solid electrolyte material was produced by the same method as the method described in Example 2.

Initially, in an insulating outer cylinder, 0.44 mol of LPS and 0.022 mol of LYC were stacked in this order. This was subjected to pressure forming at a pressure of 370 MPa so as to obtain an LPS-LYC multilayer body. A working electrode composed of LYC was obtained by arranging a stainless steel pin on LYC in the multilayer body.

Subsequently, an In—Li alloy was produced by stacking an In metal (thickness of 200 μm), a Li metal (thickness of 300 μm), and an In metal (thickness of 200 μm) in this order to come into contact with LPS in the multilayer body and by subjecting this to pressure forming at a pressure of 80 MPa. An In—Li alloy reference-cum-counter electrode was obtained by arranging a stainless steel pin on the In—Li alloy. Consequently, a bipolar electrochemical cell composed of SUS|LYC|LPS|In—Li alloy was obtained.

Thereafter, the inside of the insulating outer cylinder was cut off from the external atmosphere and hermetically sealed by using an insulating ferrule.

Finally, a surface pressure of 150 MPa was applied to the electrochemical cell by vertically constraining the electrochemical cell with four volts.

In this manner, the electrochemical cell for producing a reduced form of LYC was produced.

The reduced form of LYC (hereafter referred to as "red-LYC") was produced under the following condition by using the above-described electrochemical cell.

The electrochemical cell was placed in a constant temperature bath at 70° C. Thereafter, a working electrode obtained by applying a current to the electrochemical cell at a current density of current value 0.1 mA/cm² and by completing the application of the current when an amount of the current applied reached 1 electron per LYC molecule was taken as a red-LYC (1e charge) sample, and a working electrode obtained by completing the application of the current when an amount of the current applied reached 2 electrons per LYC molecule was taken as a red-LYC (2e charge) sample. In addition, a current was applied to the electrochemical cell at a current density of current value 0.1 mA/cm² so as to lower the potential of a working electrode to −0.6 V (vs LiIn), and the resulting working electrode was taken as a red-LYC (full charge) sample.

Meanwhile, a current was applied to the electrochemical cell at a current density of current value 0.1 mA/cm² so as to lower the potential of a working electrode to −0.6 V (vs LiIn), a current was applied in the opposite direction at a current density of current value 0.1 mA/cm², the application of the current was completed when an amount of the current applied reached 1 electron per LYC molecule, and the resulting working electrode was taken as a red-LYC (1e discharge) sample. In addition, a current was applied to the electrochemical cell at a current density of current value 0.1 mA/cm² so as to lower the potential of a working electrode to −0.6 V (vs LiIn), a current was applied in the opposite direction at a current density of current value 0.1 mA/cm² so as to increase the potential of the working electrode to 1.9 V (vs LiIn), and the resulting working electrode was taken as a red-LYC (full discharge) sample.

FIG. 1 is a graph illustrating X-ray diffraction patterns of red-LYC samples. The results illustrated in FIG. 1 are on the basis of the measurement by using the following method.

A fully automatic multipurpose X-ray diffraction system (SmartLab produced by Rigaku Corporation) was used, and an X-ray diffraction pattern of red-LYC was measured in a dry environment at a dew point of lower than or equal to −50° C. The Cu—Kα1 ray was used as the X-ray source. That is, the Cu—Kα ray (wavelength of 1.5405 Å, i.e. 0.15405 nm) was used as the X-ray, and an X-ray diffraction pattern was measured by using the θ-2θ method.

Each of the peak tops of the X-ray diffraction peaks of red-LYC was present between the peak top position of the X-ray diffraction peak derived from LYC (that is, the position of θa) and the peak top position of the peak of LiCl (that is, the position of θb). In this regard, the peak of LiCl illustrated in FIG. 1 is on the basis of the data (ICSD No. 26909) included in the inorganic crystal structure database (ICSD).

As illustrated in FIG. 1, the X-ray diffraction peak of red-LYC shifts from the peak top position of the X-ray diffraction peak derived from LYC (that is, the position of θa) to the peak top position of the peak of LiCl (that is, the position of θb) in accordance with charging (Li occlusion) and shifts from the peak top position of the X-ray diffraction peak of LiCl to the peak top position of the peak of LYC in accordance with discharging (Li release).

There is no particular limitation regarding the shape of the halide reduced form in the first embodiment. The shape of the halide reduced form may be, for example, the shape of a needle, a sphere, or an elliptical sphere. For example, the shape of the halide reduced form may be particulate.

There is no particular limitation regarding the method for producing the halide reduced form, and a known method in which a halide solid electrolyte material can be reduced may be used. Examples of the method include an electrochemical technique. For example, in the same manner as the above-described method for producing LYC, an electrochemical cell in which a Li-containing compound is used for the counter electrode and a halide solid electrolyte material is used for a working electrode is prepared. The halide reduced form can be produced by applying a constant current to the resulting cell so as to reduce the halide solid electrolyte material of the working electrode.

Regarding a conductive auxiliary contained in the negative electrode material according to the first embodiment, for example, graphite such as natural graphite and artificial graphite, carbon black such as acetylene black and ketjenblack, conductive fibers such as carbon fibers and metal fibers, carbon fluoride, metal powders such as aluminum, conductive whiskers such as zinc oxide and potassium titanate, conductive metal oxides such as titanium oxide, and conductive polymer compounds such as polyanilines, polypyrroles, and polythiophenes may be used. In the case in which carbon-based materials are used as the conductive auxiliary, the cost can be reduced.

In the negative electrode material according to the first embodiment, the conductive auxiliary may contain acetylene black. The conductive auxiliary may be composed of acetylene black alone. In the case in which the negative electrode material according to the first embodiment contains acetylene black as the conductive auxiliary, the charge-discharge efficiency of the battery can be further improved.

The negative electrode material according to the first embodiment may further contain a second solid electrolyte material.

According to the above-described configuration, the charge-discharge efficiency and the discharge capacity of the battery can be further improved.

In this regard, the reduction potential of the second solid electrolyte material with respect to lithium may be lower than the reduction potential of the first solid electrolyte material with respect to lithium.

In the case in which the reduction potential of the second solid electrolyte material with respect to lithium is lower than the reduction potential of the first solid electrolyte material with respect to lithium, the second solid electrolyte material is not decomposed during Li occlusion and Li release of the halide reduced form. Consequently, the negative electrode material according to the first embodiment can ensure favorable ionic conductivity and can improve the charge-discharge efficiency and the discharge capacity of the battery.

In this regard, the reduction potential of the solid electrolyte material with respect to lithium is measured by using, for example, the following method.

Initially, in an insulating outer cylinder, SUS foil, a solid electrolyte material, and lithium foil are stacked in this order. This was subjected to pressure forming so as to produce a multilayer body. Subsequently, a stainless steel collector is arranged on the top and bottom of the multilayer body, and a collector lead is attached to each collector. Finally, the insulating outer cylinder is cut off from the external atmosphere and hermetically sealed by using an insulating ferrule so as to produce a reduction potential measurement cell.

The resulting reduction potential measurement cell is placed in a constant temperature bath at 25° C. The reduction potential with respect to lithium is measured by performing potential scanning from −0.5 V to 6 V in terms of lithium reference potential at a rate of 5 mV/s on the basis of a cyclic voltammetry measurement.

Regarding the second solid electrolyte material, for example, sulfide solid electrolyte materials and oxide solid electrolyte materials may be used.

Regarding the sulfide solid electrolyte materials, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$, and the like may be used. Further, LiX (X: F, Cl, Br, or I), $Li_2O$, $MO_q$, $Li_pMO_q$ (M: at least one selected from the group consisting of P, Si, Ge, B, Al, Ga, In, Fe, and Zn) (p, q: a natural number), and the like may be added to them.

Regarding the oxide solid electrolyte materials, for example, NASICON-type solid electrolyte materials represented by $LiTi_2(PO_4)_3$ and element substitution products thereof, $(LaLi)TiO_3$-based perovskite-type solid electrolyte materials, LISICON-type solid electrolyte materials represented by $Li_{14}ZnGe_4O_{16}$, $Li_4SiO_4$, and $LiGeO_4$ and element substitution products thereof, garnet-type solid electrolyte materials represented by $Li_7La_3Zr_2O_{12}$ and element substitution products thereof, $Li_3N$ and H substitution products thereof, $Li_3PO_4$ and N substitution products thereof, glass in which a Li—B—O compound such as $LiBO_2$ or $Li_3BO_3$ serves as a base and $Li_2SO_4$, $Li_2CO_3$, or the like is added thereto, and glass ceramic may be used.

The second solid electrolyte material may contain the sulfide solid electrolyte material. For example, the second solid electrolyte material may contain $Li_2S$—$P_2S_5$. $Li_2S$—$P_2S_5$ has high ionic conductivity and is stable against reduction, Therefore, the negative electrode material according to the first embodiment containing $Li_2S$—$P_2S_5$ enables the charge-discharge efficiency and the discharge capacity of the battery to be further improved.

There is no particular limitation regarding the shape of the second solid electrolyte material. The shape may be, for example, the shape of a needle, a sphere, or an elliptical sphere. For example, the shape of the second solid electrolyte material may be particulate.

Figure 2:
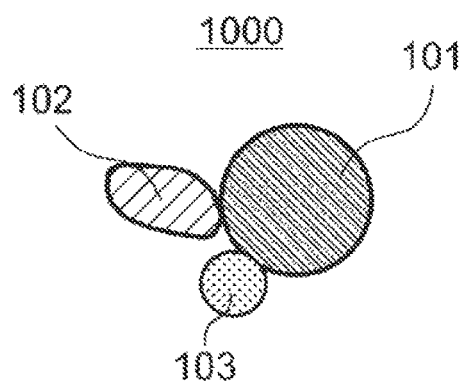
FIG. 2 is a schematic sectional view illustrating the configuration of a negative electrode material 1000 that is an example of a negative electrode material in a first embodiment.

FIG. 2 is a schematic sectional view illustrating the configuration of a negative electrode material 1000 that is an example of the negative electrode material in the first embodiment. In this example, the shape of the halide reduced form is particulate (for example, spherical), and the shape of the second solid electrolyte material is particulate (for example, spherical).

The negative electrode 1000 in the first embodiment includes a halide reduced form particle 101, a second solid electrolyte particle 102, and a conductive auxiliary 103.

For example, in the case in which the shape of the halide reduced form particle 101 in the first embodiment is particulate (for example, spherical), the median diameter of the halide reduced form particles 101 may be greater than or equal to 0.1 μm and less than or equal to 100 μm. In this regard, in the present specification, the median diameter of particles denotes a particle diameter at a cumulative volume of 50% (d50) that is determined from grain size distribution measured by a laser diffraction scattering method on a volume basis.

In the negative electrode material 1000, the median diameter of the halide reduced form particles 101 being greater than or equal to 0.1 μm enables the halide reduced form particles 101 and the second solid electrolyte particles 102 to form a favorable dispersion state in the negative electrode material 1000. Consequently, the charge-discharge characteristics of the battery are improved. Meanwhile, the median diameter of the halide reduced form particles 101 being less than or equal to 100 μm accelerates lithium diffusion in the halide reduced form particles 101. Consequently, the operation of the battery with a high output is facilitated.

The median diameter of the halide reduced form particles 101 may be greater than the median diameter of the second solid electrolyte particles 102. Consequently, the halide reduced form particles 101 and the second solid electrolyte particles 102 can form a favorable dispersion state.

The median diameter of the second solid electrolyte particles 102 may be less than or equal to 100 μm. The median diameter being less than or equal to 100 μm enables the halide reduced form particles 101 and the second solid electrolyte particles 102 to form a favorable dispersion state in the negative electrode material. Consequently, the charge-discharge characteristics are improved.

In addition, the median diameter of the second solid electrolyte particles 102 may be less than or equal to 10 μm.

According to the above-described configuration, the halide reduced form particles 101 and the second solid electrolyte particles 102 can form a favorable dispersion state in the negative electrode material.

The negative electrode 1000 in the first embodiment may include a plurality of halide reduced form particles 101 and a plurality of second solid electrolyte particles 102.

In this regard, the content of the halide reduced form particles 101 and the content of the second solid electrolyte particles 102 in the negative electrode material 1000 in the first embodiment may be equal to each other or may be differ from each other.

The negative electrode material in the first embodiment may contain materials other than the halide reduced form, the conductive auxiliary, and the second solid electrolyte material. The negative electrode material in the first embodiment may contain, for example, a negative electrode active material and a binder. Regarding the binder, materials described as examples of a binder contained in at least one of a negative electrode, an electrolyte layer, and a positive electrode in a second embodiment described later may be used.

The negative electrode material in the first embodiment may contain the negative electrode active material that has characteristics of occluding and releasing metal ions (for example, lithium ions). Regarding the negative electrode active material, for example, metal materials, carbon materials, oxides, nitrides, tin compounds, and silicon compounds may be used. The metal materials may be simple metals. Alternatively, the metal materials may be alloys. Examples of the metal materials include lithium metal and lithium alloys. Examples of the carbon materials include natural graphite, coke, graphitizing carbon, carbon fibers, spherical carbon, artificial graphite, and amorphous carbon.

The negative electrode material in the first embodiment may contain, for example, greater than or equal to 30% by mass of halide reduced form or may contain greater than or equal to 80% by mass. The negative electrode material containing greater than or equal to 30% by mass of halide reduced form enables the energy density of the battery to be sufficiently ensured.

According to the above-described configuration, the negative electrode material in the first embodiment can improve the charge-discharge efficiency of the battery.

The negative electrode material in the first embodiment may contain, for example, less than or equal to 20% by mass of conductive auxiliary or may contain less than or equal to 10% by mass. The negative electrode material containing less than or equal to 20% by mass of conductive auxiliary enables the energy density of the battery to be sufficiently ensured.

According to the above-described configuration, the negative electrode material in the first embodiment can improve the charge-discharge efficiency of the battery.

The negative electrode material in the first embodiment may contain, for example, less than or equal to 70% by mass of second solid electrolyte material or may contain less than or equal to 20% by mass.

According to the above-described configuration, the negative electrode material in the first embodiment can improve the charge-discharge efficiency of the battery.

In the negative electrode material in the first embodiment, regarding the volume ratio "v:(100−v)" of the halide reduced form to the second solid electrolyte material (where v represents the volume ratio of the halide reduced form), $30 \leq v \leq 95$ may be satisfied, In the case in which $30 \leq v$ applies, a sufficient energy density of the battery can be ensured. Meanwhile, in the case in which $v \leq 95$ applies, the operation with a high output is facilitated.

The negative electrode material according to the first embodiment may be produced by, for example, mixing a reduced form of the halide solid electrolyte material produced in advance, the conductive auxiliary, and the second solid electrolyte material when the second solid electrolyte material is added. Regarding another method, the negative electrode material according to the first embodiment may be produced by, for example, mixing the halide solid electrolyte material, the conductive auxiliary, and the second solid electrolyte material, preparing an electrochemical cell in which the resulting mixture serves as a working electrode and a Li-containing compound serves as a counter electrode, and applying a constant current to the resulting cell so as to reduce the halide solid electrolyte material of the working electrode.

Second Embodiment

A second embodiment will be described below. The same explanations as for the first embodiment above are appropriately omitted.

Figure 3:
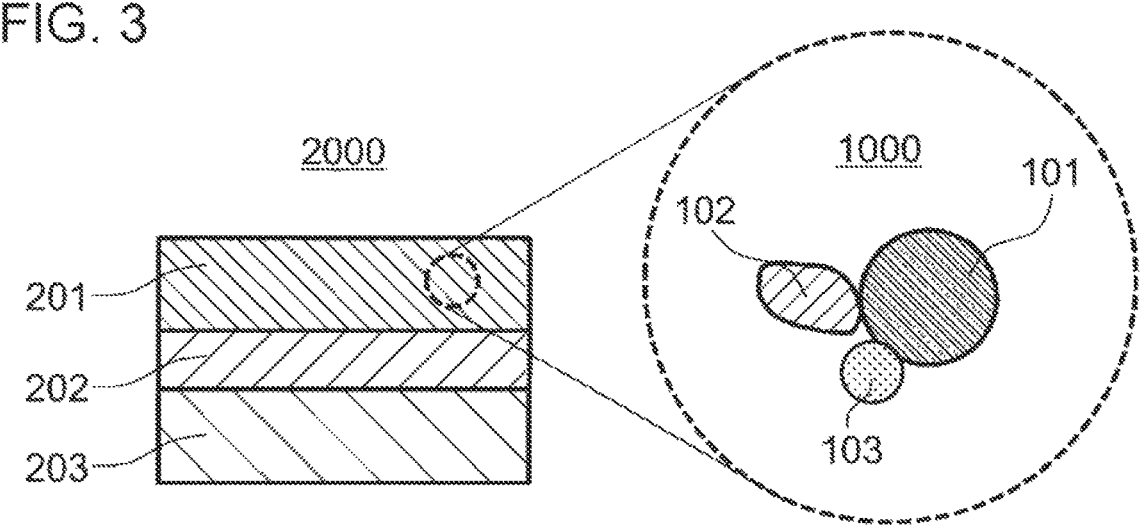
FIG. 3 is a schematic sectional view illustrating the configuration of a battery 2000 that is an example of a battery in a second embodiment.

FIG. 3 is a schematic sectional view illustrating the configuration of a battery in the second embodiment.

A battery 2000 according to the second embodiment includes a negative electrode 201, an electrolyte layer 202, and a positive electrode 203.

The negative electrode 201 contains the same negative electrode material 1000 as in the first embodiment.

The electrolyte layer 202 is arranged between the negative electrode 201 and the positive electrode 203.

According to the above-described configuration, the charge-discharge efficiency of the battery according to the second embodiment can be improved.

In this regard, the negative electrode 201 may be composed of the negative electrode material 1000 alone in the first embodiment.

According to the above-described configuration, the charge-discharge efficiency of the battery according to the second embodiment can be further improved.

The thickness of the negative electrode 201 may be greater than or equal to 10 μm and less than or equal to 500 μM. Setting the thickness of the negative electrode to be greater than or equal to 10 μm enables a sufficient energy density to be ensured. Meanwhile, setting the thickness of the negative electrode to be less than or equal to 500 μm facilitates the operation with a high output. That is, the thickness of the negative electrode 201 being appropriately adjusted enables the energy density of the battery to be sufficiently ensured and enables the battery to operate with a high output.

The electrolyte layer 202 is a layer containing an electrolyte material. The electrolyte material is, for example, a solid electrolyte material. That is, the electrolyte layer 202 may be a solid electrolyte layer.

Regarding the solid electrolyte material contained in the electrolyte layer 202, for example, halide solid electrolyte materials, sulfide solid electrolyte materials, oxide solid electrolyte materials, polymer solid electrolyte materials, and complex hydride solid electrolyte materials may be used.

Regarding the halide solid electrolyte materials, the same halide solid electrolyte material as the halide solid electrolyte material that is before being reduced to the halide reduced form contained in the negative electrode material according to the first embodiment may be used, or other halide solid electrolyte materials different from the above may be used.

Regarding the sulfide solid electrolyte materials, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$, and the like may be used. Further, LiX (X: F, Cl, Br, or I), $Li_2O$, $MO_q$, $Li_pMO_q$ (M: at least one selected from the group consisting of P, Si, Ge, B, Al, Ga, In, Fe, and Zn) (p, q: a natural number), and the like may be added to them.

Regarding the oxide solid electrolyte materials, for example, NASICON-type solid electrolyte materials represented by $LiTi_2(PO_4)_3$ and element substitution products thereof, $(LaLi)TiO_3$-based perovskite-type solid electrolyte materials, LISICON-type solid electrolyte materials represented by $Li_{14}ZnGe_4O_{16}$, $Li_4SiO_4$, and $LiGeO_4$ and element substitution products thereof, garnet-type solid electrolyte materials represented by $Li_7La_3Zr_2O_{12}$ and element substitution products thereof, $Li_3N$ and H substitution products thereof, $Li_3PO_4$ and N substitution products thereof, glass in which a Li—B—O compound such as $LiBO_2$ or $Li_3BO_3$ serves as a base and $Li_2SO_4$, $Li_2CO_3$, or the like is added thereto, and glass ceramic may be used.

Regarding the polymer solid electrolyte materials, for example, compounds of polymer compounds and lithium salts may be used. The polymer compound may have an ethylene oxide structure. Having an ethylene oxide structure enables a large amount of lithium salt to be contained and enables the ionic conductivity to be further enhanced. Regarding the lithium salts, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and the like may be used. At least one lithium salt selected from these may be used alone as the lithium salt. Alternatively, mixtures of at least two lithium salts selected from these may be used as the lithium salt.

Regarding the complex hydride solid electrolyte materials, for example, $LiBH_4$—LiI and $LiBH_4$—$P_2S_5$ may be used.

In this regard, the electrolyte layer 202 may contain a solid electrolyte material as a primary component. That is, the electrolyte layer 202 may contain, for example, greater than or equal to 50% in terms of mass ratio (greater than or equal to 50% by mass) of solid electrolyte material relative to the total of the electrolyte layer 202.

According to the above-described configuration, the charge-discharge characteristics of the battery can be further improved.

In addition, the electrolyte layer 202 may contain, for example, greater than or equal to 70% in terms of mass ratio (greater than or equal to 70% by mass) of solid electrolyte material relative to the total of the electrolyte layer 202.

According to the above-described configuration, the charge-discharge characteristics of the battery can be further improved.

In this regard, the electrolyte layer 202 may contain a solid electrolyte material as a primary component while further containing incidental impurities or starting raw materials used for synthesizing the solid electrolyte material and byproducts, decomposition products, and the like.

Meanwhile, the electrolyte layer 202 may contain, for example, 100% in terms of mass ratio (100% by mass) of solid electrolyte material relative to the total of the electrolyte layer 202 except incidentally included impurities.

According to the above-described configuration, the charge-discharge characteristics of the battery can be further improved.

As described above, the electrolyte layer 202 may be composed of the solid electrolyte material alone.

In this regard, the electrolyte layer 202 may contain at least two of materials listed as the solid electrolyte materials. For example, the electrolyte layer 202 may contain the halide solid electrolyte material and the sulfide solid electrolyte material.

The thickness of the electrolyte layer 202 may be greater than or equal to 1 μm and less than or equal to 300 μm. In the case in which the thickness of the electrolyte layer 202 is greater than or equal to 1 μm, there is a low possibility of a short circuit occurring between the negative electrode 201 and the positive electrode 203. Meanwhile, in the case in which the thickness of the electrolyte layer 202 is less than or equal to 300 μm, the operation with a high output is facilitated. That is, the thickness of the electrolyte layer 202 being appropriately adjusted enables sufficient safety of the battery to be ensured and enables the battery to operate with a high output.

The positive electrode 203 contains positive electrode active material particles and solid electrolyte particles.

The positive electrode 203 contains a positive electrode active material that has characteristics of occluding and releasing metal ions (for example, lithium ions). Regarding the positive electrode active material, lithium-containing transition metal oxides, transition metal fluorides, polyanion materials, fluorized polyanion materials, transition metal sulfides, transition metal oxysulfides, transition metal oxynitrides, and the like may be used. In particular, using the lithium-containing transition metal oxide as the positive electrode active material enables the production cost to be reduced and enables the average discharge voltage to be increased. Examples of the lithium-containing transition metal oxides include $Li(NiCoAl)O_2$, $Li(NiCoMn)O_2$, and $LiCoO_2$.

The positive electrode 203 may contain the solid electrolyte material. Regarding the solid electrolyte material, solid electrolyte materials described as examples of the material for constituting the electrolyte layer 202 may be used. According to the above-described configuration, the lithium ion conductivity inside the positive electrode 203 is enhanced and the operation with a high output is made possible.

The median diameter of the positive electrode active material particles may be greater than or equal to 0.1 μm and less than or equal to 100 μm. In the positive electrode, the median diameter of the positive electrode active material particles being greater than or equal to 0.1 μm enables the positive electrode active material particles and the solid electrolyte material to form a favorable dispersion state.

Consequently, the charge-discharge characteristics of the battery are improved. Meanwhile, the median diameter of the positive electrode active material particles being less than or equal to 100 µm accelerates lithium diffusion in the positive electrode active material particles. Consequently, the operation of the battery with a high output is facilitated. That is, the positive electrode active material particles having an appropriate size enables the battery having excellent charge-discharge characteristics and being capable of operating with a high output to be obtained.

The median diameter of the positive electrode active material particles may be greater than the median diameter of the solid electrolyte material. Consequently, the positive electrode active material particles and the solid electrolyte material can form a favorable dispersion state.

Regarding the volume ratio "v:(100−v)" of the positive electrode active material particles to the solid electrolyte material contained in the positive electrode 203 (where v represents the volume ratio of the positive electrode active material particles), $30 \leq v \leq 95$ may be satisfied. In the case in which $30 \leq v$ applies, a sufficient energy density of the battery can be ensured. Meanwhile, in the case in which $v \leq 95$ applies, the operation of the battery with a high output is facilitated.

The thickness of the positive electrode 203 may be greater than or equal to 10 µm and less than or equal to 500 µm. The thickness of the positive electrode being greater than or equal to 10 µm enables a sufficient energy density of the battery to be ensured. Meanwhile, the thickness of the positive electrode being less than or equal to 500 µm enables the battery to operate with a high output. That is, the thickness of the positive electrode 203 being adjusted to within an appropriate range enables the energy density of the battery to be sufficiently ensured and enables the battery to operate with a high output.

A binder may be contained in at least one of the negative electrode 201, the electrolyte layer 202, and the positive electrode 203. The adhesiveness between particles can be improved by the binder. The binder can improve the binding properties of the materials constituting the electrode. Examples of the binder include polyvinylidene fluorides, polytetrafluoroethylenes, polyethylenes, polypropylenes, aramid resins, polyamides, polyimides, polyimide-imides, polyacrylonitriles, polyacrylic acids, polyacrylic acid methyl esters, polyacrylic acid ethyl esters, polyacrylic acid hexyl esters, polymethacrylic acids, polymethacrylic acid methyl esters, polymethacrylic acid ethyl esters, polymethacrylic acid hexyl esters, polyvinyl acetates, polyvinyl pyrrolidones, polyethers, polyether sulfones, hexafluoropolypropylenes, styrene-butadiene rubber, and carboxymethyl cellulose. In addition, regarding the binder, copolymers of at least two materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. At least two selected from these may be mixed and used as the binder.

At least one of the negative electrode 201 and the positive electrode 203 may contain a conductive auxiliary. The electron conductivity can be enhanced by the conductive auxiliary. Regarding the conductive auxiliary, for example, graphite such as natural graphite and artificial graphite, carbon black such as acetylene black and ketjenblack, conductive fibers such as carbon fibers and metal fibers, carbon fluoride, metal powders such as aluminum, conductive whiskers such as zinc oxide and potassium titanate, conductive metal oxides such as titanium oxide, and conductive polymer compounds such as polyanilines, polypyrroles, and polythiophenes may be used. In the case in which carbon conductive auxiliaries are used, the cost can be reduced.

Incidentally, the battery in the second embodiment may be constructed as batteries having various types of shapes such as a coin type, a cylindrical type, a square type, a sheet type, a button type, a flat type, a stacked type, and the like.

There is no particular limitation regarding the operation temperature of the battery, and the temperature may be −50° C. to 100° C. Higher temperature enables the ionic conductivity of the halide reduced form to be improved and enables the operation with a high output to be facilitated.

The battery in the second embodiment may be produced by, for example, preparing each of a material for forming the positive electrode, a material for forming the electrolyte layer, and a material for forming the negative electrode and producing a multilayer body in which the positive electrode, the electrolyte layer, and the negative electrode are arranged in this order by using a known method.

Regarding other production methods, for example, the following method can also be used.

Initially, a multilayer body in which the positive electrode, the electrolyte layer, and a negative electrode precursor layer containing the halide solid electrolyte material in the state before being reduced to the halide reduced form contained in the negative electrode material in the first embodiment are arranged in this order is produced.

Subsequently, a constant current is applied to the resulting multilayer body. In this case, the positive electrode functions as the counter electrode, and the negative electrode precursor layer functions as the working electrode so as to reduce the halide solid electrolyte material in the negative electrode precursor layer. Consequently, the battery in the second embodiment including the positive electrode, the electrolyte layer, and the negative electrode that contains the halide reduced form and the conductive auxiliary is obtained.

That is, an example of the method for producing the battery according to the second embodiment includes producing a multilayer body in which the positive electrode, the electrolyte layer, and a negative electrode precursor layer containing the conductive auxiliary and the halide solid electrolyte material in the state before being reduced to the halide reduced form contained in the negative electrode material in the first embodiment are arranged in this order, and applying a current to the resulting multilayer body.

EXAMPLE

The present disclosure will be described below in detail with reference to the examples and the comparative example. In this regard, the negative electrode material and the battery according to the present disclosure are not limited to the following examples.

Example 1

Production of First Solid Electrolyte Material

In an argon glove box at a dew point of lower than or equal to −60° C., LiCl and YCl₃ serving as raw material powders were weighed at a molar ratio of LiCl:YCl₃=2.7: 1.1. Thereafter, these raw material powders were mixed, and the resulting mixture was subjected to milling treatment for 25 hours at 600 rpm by using a planetary ball mill (Model P-5 produced by Fritsch). In this manner, a powder of the first solid electrolyte material $Li_{2.7}Y_{1.1}Cl_6$ (that is, LYC) was obtained.

Production of Negative Electrode Material Precursor

In an argon glove box, LYC and acetylene black (hereafter also referred to as "AB") serving as the conductive auxiliary were weighed at a mass ratio of 90:10. These were mixed in an agate mortar so as to produce a negative electrode material precursor.

Example 2

Production of Second Solid Electrolyte Material

In an argon glove box at a dew point of lower than or equal to −60° C., $Li_2S$ and $P_2S_5$ serving as raw material powders were weighed at a molar ratio of $Li_2S:P_2S_5=75:25$. These raw material powders were pulverized in a mortar and mixed. Thereafter, the resulting mixture was subjected to milling treatment for 10 hours at 510 rpm by using a planetary ball mill (Model P-7 produced by Fritsch). The resulting glass-like solid electrolyte was heat-treated in an inert atmosphere at 270° C. for 2 hours. In this manner, a glass-ceramic-Ike solid electrolyte material $Li_2S—P_2S_5$ (that is, LPS) was obtained.

Production of Negative Electrode Material Precursor

In an argon glove box, LYC, LPS, and AB serving as the conductive auxiliary were weighed at a mass ratio of 30:60:10. These were mixed in an agate mortar so as to produce a negative electrode material precursor.

Comparative Example 1

Production of Sulfide Solid Electrolyte

In an argon glove box at a dew point of lower than or equal to −60° C., $Li_2S$, $P_2S_5$, and $GeS_2$ serving as raw material powders were weighed at a molar ratio of $Li_2S:P_2S_5:GeS_2=5:1:1$. These raw material powders were pulverized in a mortar and mixed. Thereafter, miffing treatment was performed for 10 hours at 510 rpm by using a planetary ball mill (Model P-7 produced by Fritsch). In this manner, a sulfide solid electrolyte material $Li_{10}GeP_2S_{12}$ (hereafter referred to as "LGPS") was obtained.

Production of Negative Electrode Material Precursor

In an argon glove box, LGPS, LPS, and AB were weighed at a mass ratio of 30:60:10. These were mixed in an agate mortar so as to produce a negative electrode material precursor.

Reference Example 1

Production of Negative Electrode Material Precursor

LYC was used alone as the negative electrode material precursor.

Reference Example 2

Production of Negative Electrode Material Precursor

In an argon glove box, LYC and LPS were weighed at a mass ratio of 40:60. These were mixed in an agate mortar so as to produce a negative electrode material precursor.

Production of Battery

Regarding the negative electrode material precursor of each of Example 1, Example 2, Comparative example 1, Reference example 1, and Reference example 2, an electrochemical cell was produced.

Initially, in an insulating outer cylinder, 80 mg of LPS and 7.2 mg of negative electrode material precursor were stacked in this order. This was subjected to pressure forming at a pressure of 740 MPa so as to obtain a multilayer body of the negative electrode precursor layer and the solid electrolyte layer.

Subsequently, an In metal (thickness of 200 μm), a Li metal (thickness of 300 μm), and an In metal (thickness of 200 μm) were stacked in this order on one surface of the solid electrolyte layer opposite to the surface in contact with the negative electrode precursor layer. This was subjected to pressure forming at a pressure of 80 MPa so as to produce a bipolar electrochemical cell composed of the negative electrode precursor layer (that is, a working electrode), the solid electrolyte layer, and the counter electrode serving as the positive electrode.

Thereafter, a stainless steel collector was arranged on the top and bottom of the multilayer body, and a collector lead was attached to each collector.

Next, the inside of the insulating outer cylinder was cut off from the external atmosphere and hermetically sealed by using an insulating ferrule.

Finally, a surface pressure of 150 MPa was applied to the multilayer body composed of the working electrode, the solid electrolyte layer, and the counter electrode by vertically constraining the multilayer body with four volts.

In this manner, the battery was obtained. In this regard, in the resulting battery, the halide solid electrolyte material contained in the negative electrode at this stage was in the state before being reduced.

Evaluation of Battery

Charge-Discharge Test

A charge-discharge test was performed by using the battery of each of Example 1, Example 2, Comparative example 1, Reference example 1, and Reference example 2 under the following condition.

The battery was placed in a constant temperature bath at 25° C.

The battery was charged to a voltage of −0.52 V (vs LiIn) at a current density of current value 0.1 mA/cm² so as to produce a battery including a negative electrode containing a halide reduced form (that is, red-LYC) or a sulfide reduced form (that is, red-LGPS).

Subsequently, discharge to a voltage of 1.9 V (vs LiIn) was performed at a current density of current value 0.1 mA/cm².

In this manner, the charge capacity, the discharge capacity, and the charge-discharge efficiency(=charge capacity/discharge capacity) of the battery of each of Example 1, Example 2, Comparative example 1, Reference example 1, and Reference example 2 were obtained. These results are described in Table 1.

TABLE 1

|  | First solid electrolyte material | Second solid electrolyte material | Conductive auxiliary | Charge capacity [mAh/g] | Discharge capacity [mAh/g] | Charge discharge efficiency [%] |
|---|---|---|---|---|---|---|
| Example 1 | red-LYC | none | AB | 84 | 60 | 71.8 |
| Example 2 | red-LYC | LPS | AB | 253 | 201 | 79.5 |
| Comparative example 1 | red-LGPS | LPS | AB | 615 | 80 | 13.0 |

TABLE 1-continued

| | First solid electrolyte material | Second solid electrolyte material | Conductive auxiliary | Charge capacity [mAh/g] | Discharge capacity [mAh/g] | Charge discharge efficiency [%] |
|---|---|---|---|---|---|---|
| Reference example 1 | red-LYC | none | none | 170 | 68 | 39.8 |
| Reference example 2 | red-LYC | LPS | none | 153 | 18 | 11.9 |

Consideration

It was ascertained from comparisons of the results of Example 1 and Example 2 with the results of Comparative example 1, Reference example 1, and Reference example 2, described in Table 1, that the charge-discharge efficiency of the battery is improved by using the negative electrode containing the halide reduced form and the conductive auxiliary.

It was ascertained from the results of Examples 1 and 2 that in the case in which the negative electrode further contains the second solid electrolyte material, a charge capacity close to a theoretical capacity of 269 mAh/g when LYC is reduced by a three-electron reaction is exhibited and the charge capacity and the discharge capacity of the battery are further improved.

It was ascertained from the results of Example 2 and Comparative example 1 that the compatibility between a high charge-discharge efficiency and a high discharge capacity of the battery can be ensured by using the halide reduced form.

It was ascertained from the results of Example 1 and Reference example 1 that the charge-discharge efficiency of the battery is improved by adding the conductive auxiliary to the halide reduced form compared with the case of just the halide reduced form.

It was ascertained from the results of Example 2 and Reference example 2 that the charge-discharge efficiency of the battery is improved by adding the conductive auxiliary to the halide reduced form and the second solid electrolyte material compared with the case of just the halide reduced form and the second solid electrolyte material.

Consequently, It was ascertained that the charge-discharge efficiency of the battery is improved by using the negative electrode material containing the reduced form of the first solid electrolyte material denoted by a composition formula $Li_\alpha M_\beta X_\gamma$, where each of $\alpha$, $\beta$, and $\gamma$ is a value greater than 0, M includes at least one of metal elements except Li and semimetals, and X represents at least one element selected from the group consisting of Cl, Br, I, and F and containing the conductive auxiliary.

The battery according to the present disclosure may be used as, for example, all-solid lithium ion secondary batteries.

What is claimed is:

1. A negative electrode material comprising a reduced form of a first solid electrolyte material and a conductive auxiliary,
    wherein the first solid electrolyte material is denoted by Formula (1) below, $$Li_\alpha M_\beta X_\gamma \qquad \text{Formula (1)}$$

herein, in Formula (1),
    each of $\alpha$, $\beta$, and $\gamma$ is a value greater than 0,
    M represents at least one element selected from the group consisting of metal elements except Li and semimetals, and X represents at least one element selected from the group consisting of F, Cl, Br, and I.

2. The negative electrode material according to claim 1, wherein a peak top is present at the value of the diffraction angle 2θ within the range of greater than θa and less than or equal to θb in an X-ray diffraction pattern of the reduced form obtained by X-ray diffraction measurement in which the Cu-Kα ray is used as a radiation source,
    θb is a value of the diffraction angle 2θ of the peak top of a peak reflecting the (220) face of LiX composed of Li and X, and
    θa is a value of the diffraction angle 2θ of the peak top of a peak derived from the first solid electrolyte material, which is not reduced, and is a value closest to θb.

3. The negative electrode material according to claim 1, wherein the first solid electrolyte material satisfies $1.5 \leq \alpha \leq 4.5,$ $0.5 \leq \beta \leq 1.5,$ and $\gamma = 6.$ 4. The negative electrode material according to claim 1, wherein the first solid electrolyte material satisfies the relationship represented by $\alpha + m\beta = \gamma$ herein m represents the valence of M above.

5. The negative electrode material according to claim 1, wherein M contains at least one element selected from the group consisting of transition metal elements.

6. The negative electrode material according to claim 5, wherein M contains yttrium.

7. The negative electrode material according to claim 6, wherein the first solid electrolyte material is denoted by Formula (2) below, $$Li_a Me_b Y_c X_6 \qquad \text{Formula (2)}$$

herein, in Formula (2) above,
    a, b, and c satisfy $a + m_e b + 3c = 6$ and $c > 0$,
    Me represents at least one element selected from the group consisting of metal elements except Li and Y and semimetals, and
    $m_e$ represents the valence of Me above.

8. The negative electrode material according to claim 1, wherein the conductive auxiliary contains acetylene black.

9. A negative electrode material comprising a reduced form of a first solid electrolyte material, a conductive auxiliary and a second solid electrolyte material,
    wherein the first solid electrolyte material is denoted by Formula (1) below, $$Li_\alpha M_\beta X_\gamma \qquad \text{Formula (1)}$$

wherein, in Formula (1),
    each of $\alpha$, $\beta$, and $\gamma$ is a value greater than 0, M represents at least one element selected from the group consisting of metal elements except Li and semimetals, and X represents at least one element selected from the group consisting of F, Cl, Br, and I, the reduction potential of the second solid electrolyte material with respect to lithium is lower than the reduction potential of the first solid electrolyte material with respect to lithium.

10. The negative electrode material according to claim 9, wherein the second solid electrolyte material contains a sulfide solid electrolyte material.

11. The negative electrode material according to claim 10, wherein the sulfide solid electrolyte material contains $Li_2S$—$P_2S_5$.

12. A battery comprising:
a negative electrode containing a negative electrode material according to claim 1;
a positive electrode; and
an electrolyte layer disposed between the negative electrode and the positive electrode.

13. The negative electrode material according to claim 9, wherein an amount of the reduced form of the first solid electrolyte material in the negative electrode material is 30 mass % or more.

14. The negative electrode material according to claim 13, wherein 30≤v≤95 is satisfied, where v represents a volume ratio of the reduced form of the first solid electrolyte material with respect to a total volume of the reduced form of the first solid electrolyte material and the second solid electrolyte material.

15. The negative electrode material according to claim 9, wherein an amount of the second solid electrolyte material is 70 mass % of less.

16. The negative electrode material according to claim 1, wherein Li is occluded in the reduced form of the first solid electrolyte material.

17. The negative electrode material according to claim 1, wherein an amount of the reduced form of the first solid electrolyte material in the negative electrode material is 80 mass % or more.

18. A battery comprising:
a negative electrode containing the negative electrode material according to claim 9;
a positive electrode; and
an electrolyte layer disposed between the negative electrode and the positive electrode.

19. The negative electrode material according to claim 1, wherein the negative electrode material consists essentially of the reduced form of the first solid electrolyte material and the conductive auxiliary.

20. The negative electrode material according to claim 9, wherein the negative electrode material consists essentially of the reduced form of the first solid electrolyte material, the conductive auxiliary and the second solid electrolyte material.

* * * * *